US008321298B2

(12) United States Patent
Chou et al.

(10) Patent No.: US 8,321,298 B2
(45) Date of Patent: Nov. 27, 2012

(54) REAL-TIME, LOCALIZED AND MOBILE MATCHING METHOD AND SYSTEM FOR PROXY PURCHASE

(75) Inventors: Li-Der Chou, Taoyuan County (TW); Yu-Hong Lin, Koahsiung (TW)

(73) Assignee: National Central University, Taoyuan County (TW)

( * ) Notice: Subject to any disclaimer, the term of this patent is extended or adjusted under 35 U.S.C. 154(b) by 467 days.

(21) Appl. No.: 12/766,925

(22) Filed: Apr. 26, 2010

(65) Prior Publication Data

US 2011/0119159 A1    May 19, 2011

(30) Foreign Application Priority Data

Nov. 16, 2009  (TW) ............................... 98138878 A

(51) Int. Cl.
*G06Q 30/00* (2006.01)
(52) U.S. Cl. .................. 705/26.43; 705/26.41
(58) Field of Classification Search ......... 705/26.1–27.2
See application file for complete search history.

(56) References Cited

U.S. PATENT DOCUMENTS 7,251,621 B1 * 7/2007 Weng ......................... 705/26.41

OTHER PUBLICATIONS

Littlefield, J. E., Bao, Y., & Cook, D. L. (2000). Internet real estate information: Are home purchasers paying attention to it? The Journal of Consumer Marketing, 17(7), 575-590.*

* cited by examiner

*Primary Examiner* — Jeffrey A Smith
*Assistant Examiner* — Resha Desai
(74) *Attorney, Agent, or Firm* — CKC & Partners Co., Ltd.

(57) ABSTRACT

A real-time, localized and mobile matching method for proxy purchase includes the following steps: position information of several default purchasing agents is received. At least one purchase request is received from at least one client. The purchase request includes information of at least one product to be purchased and location of at least one vendor of the product to be purchased. Candidate purchasing agents, position information of which corresponds to the location of the vendor of the product to be purchased, are filtered from the default purchasing agents. The information of the candidate purchasing agents is transmitted to the client, such that a selection signal, which includes information of a selected purchasing agent selected from the candidate purchasing agents, is received from the client. The purchase request is transmitted to the selected purchasing agent through a wireless communication network.

22 Claims, 2 Drawing Sheets

REAL-TIME, LOCALIZED AND MOBILE MATCHING METHOD AND SYSTEM FOR PROXY PURCHASE

RELATED APPLICATIONS

This application claims priority to Taiwan Application Serial Number 98138878, filed Nov. 16, 2009, which is herein incorporated by reference.

BACKGROUND

1. Technical Field

The present invention relates to a matching method and system. More particularly, the present invention relates to a real-time, localized and mobile matching method and system for proxy purchase.

2. Description of Related Art

Nowadays, more and more purchasing agents provide proxy purchase service to help clients buy products. For example, if a client wants to buy a product, which is only sold in other countries, the client may request a purchasing agent to proxy purchase the product from other countries. However, purchasing agents must take product lists for proxy purchase from clients before going out to buy products to be proxy-purchased.

SUMMARY

According to one embodiment of this invention, a real-time, localized and mobile matching method for proxy purchase is provided. The real-time, localized and mobile matching method for proxy purchase includes the following steps: position information of several default purchasing agents is received. At least one purchase request is received from at least one client. The purchase request includes information of at least one product to be purchased and location of at least one vendor of the product to be purchased. Several candidate purchasing agents, position information of which corresponds to the location of the vendor of the product to be purchased, are filtered from the default purchasing agents. The information of the candidate purchasing agents is transmitted to the client, such that a selection signal, which includes information of a selected purchasing agent selected from the candidate purchasing agents, is received from the client. The purchase request is transmitted to the selected purchasing agent through a wireless communication network.

According to another embodiment of this invention, a real-time, localized and mobile matching system for proxy purchase is provided. The real-time, localized and mobile matching system for proxy purchase includes several default purchasing agents, a data transmission platform and a real-time, localized and mobile matching platform for proxy purchase. The default purchasing agents include several position generating units for generating position information of the default purchasing agents. The real-time, localized and mobile matching platform for proxy purchase builds connection with the default purchasing agents through the data transmission platform. The real-time, localized and mobile matching platform for proxy purchase includes a purchasing agent database and a processing unit, which are electrically connected with each other. The processing unit includes a position processing module, a request receiving module, a filtering module, a selecting module and a request transmitting module. The position processing module receives the position information of the default purchasing agents through the data transmission platform, and stores the position information of the default purchasing agents into the purchasing agent database. The request receiving module receives at least one purchase request from at least one client through the data transmission platform. The purchase request includes information of at least one product to be purchased and location of at least one vendor of the product to be purchased. The filtering module filters several candidate purchasing agents, position information of which corresponds to the location of the vendor of the product to be purchased, from the default purchasing agents. The selecting module transmits the information of the candidate purchasing agents to the client through the data transmission platform, such that a selection signal, which includes information of a selected purchasing agent selected from the candidate purchasing agents, is received from the client. The request transmitting module transmits the purchase request to the selected purchasing agent through the data transmission platform.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
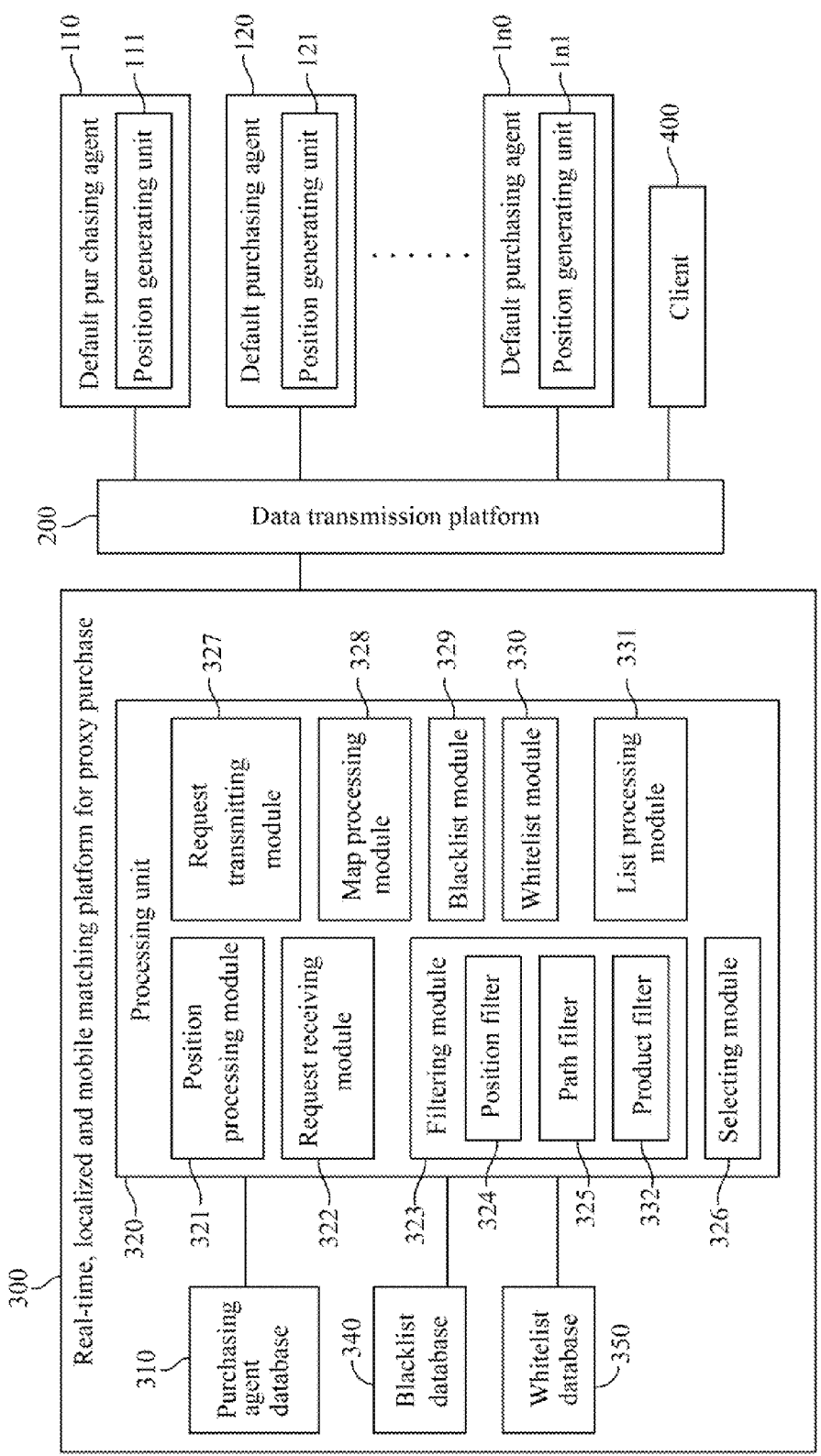
FIG. 1 is illustrates a block diagram of a real-time, localized and mobile matching system for proxy purchase according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a block diagram of a real-time, localized and mobile matching system for proxy purchase according to one embodiment of this invention. When a user of a client wants to authorize others to proxy purchase a product through the real-time, localized and mobile matching system for proxy purchase, several purchasing agents, which correspond to the location of the vendor of the product to be purchased, are provided to the client for selection.

The real-time, localized and mobile matching system for proxy purchase includes several default purchasing agents $110, 120, \ldots 1n0$, a data transmission platform $200$ and a real-time, localized and mobile matching platform for proxy purchase $300$. The data transmission platform $200$ may be Internet or a wireless communication network. Wherein, the wireless communication network may follow 2G, 3G, 3.5G, 4G, Wi-Fi, IEEE 802.11 series, Zigbee or any other wireless communication network protocol. The real-time, localized and mobile matching platform for proxy purchase $300$ builds connection with the default purchasing agents $110, 120, \ldots 1n0$ through the data transmission platform $200$. The default purchasing agents $110, 120, \ldots, 1n0$ may be a mobile phone, a wireless Personal Digital Assistance (PDA), a laptop or any other electrical device, which can build connection with the real-time, localized and mobile matching platform for proxy purchase 300 through the data transmission platform 200.

The default purchasing agents 110, 120, . . . 1n0 include position generating units 111, 121, . . . 1n1 respectively. The position generating units 111, 121, . . . 1n1 generates position information of the default purchasing agents 110, 120, . . . 1n0. The position information of the default purchasing agents 110, 120, . . . 1n0 may include present positions, proxy-purchasing paths, or any other position related information of the default purchasing agents 110, 120, . . . 1n0. The position generating units 111, 121, . . . 1n1 may be Global Positioning System (GPS) units or other types of positioning units. Therefore, the position generating units 111, 121, . . . 1n1 can utilize GPS or other positioning systems to generate the present positions of the default purchasing agents 110, 120, . . . 1n0. In addition, the position generating units 111, 121, . . . 1n1 may be input units, such as keyboard, mouse devices or other types of input unit. Therefore, users of the default purchasing agents 110, 120, . . . 1n0 can input position information through the position generating units 111, 121, . . . 1n1 (input units).

The real-time, localized and mobile matching platform for proxy purchase 300 includes a purchasing agent database 310 and a processing unit 320, which are electrically connected with each other. The processing unit 320 includes a position processing module 321, a request receiving module 322, a filtering module 323, a selecting module 326 and a request transmitting module 327. The position processing module 321 receives the position information of the default purchasing agents 110, 120, . . . 1n0 through the data transmission platform 200, and stores the position information of the default purchasing agents 110, 120, . . . 1n0 into the purchasing agent database 310. The request receiving module 322 receives at least one purchase request from at least one client 400 through the data transmission platform 200. The purchase request includes information of at least one product to be purchased and location of at least one vendor of the product to be purchased. The filtering module 323 filters several candidate purchasing agents, position information of which corresponds to the location of the vendor of the product to be purchased, from the default purchasing agents 110, 120, . . . 1n0. For example, if the position information of the default purchasing agents 110, 120 corresponds to the location of the vendor of the product to be purchased, the default purchasing agents 110, 120 may be taken as the candidate purchasing agents.

The selecting module 326 transmits the information of the candidate purchasing agents 110, 120 to the client 400 through the data transmission platform 400. The user of the client 400 may select one of the candidate purchasing agents 110, 120. For example, the candidate purchasing agents 110 is selected. Then, the client 400 transmits a selection signal, which is generated according to the selected candidate purchasing agent 110, to the real-time, localized and mobile matching platform for proxy purchase 300 through the data transmission platform 200. Then, the real-time, localized and mobile matching platform for proxy purchase 300 receives the selection signal, which includes information of the selected purchasing agent 110 selected from the candidate purchasing agents 110, 120, from the client 400.

The request transmitting module 327 transmits the purchase request to the selected purchasing agent 110 through the data transmission platform 200. Then, the user of the selected purchasing agent 110 may proxy purchase the product according to the received purchase request. Therefore, the real-time, localized and mobile matching platform for proxy purchase 300 can match the client 400 with the selected purchasing agent 110 for proxy purchase.

The filtering module 323 may filter the candidate purchasing agents according to the present positions, the proxy-purchasing paths or other position information of the default purchasing agent 110, 120, . . . 1n0. Therefore, the filtering module 323 may include a position filter 324 or a path filter 325. The position filter 325 may filter the candidate purchasing agents, present positions of which are around the location of the vendor of the product to be purchased, from the default purchasing agents 110, 120, . . . 1n0. The path filter 325 filters the candidate purchasing agents, proxy-purchasing paths of which pass through the location of the vendor of the product to be purchased, from the default purchasing agents 110, 120, . . . 1n0. In addition, a delivery point assigned by the user of the client 400 may be taken into consideration. Hence, the path filter 325 may receive a delivery point from the client 400 through the data transmission platform 200, and filter the candidate purchasing agents, proxy-purchasing paths of which pass through the location of the vendor of the product to be purchased and the delivery point, from the default purchasing agents 110, 120, . . . 1n0. Therefore, the user of the client 400 can assign a delivery point for convenient delivery.

Moreover, products, which the default purchasing agents 110, 120, . . . 1n0 are willing to proxy purchase, may be taken into consideration for filtering. Hence, the filtering module 323 may include a product filter 332. The product filter 332 obtains candidate product lists for proxy purchase from the default purchasing agents 110, 120, . . . 1n0 through the data transmission platform 200. Then, the filtering module 323 filters the candidate purchasing agents, position information of which corresponds to the location of the vendor of the product to be purchased and in the candidate product lists for proxy purchase includes the product to be purchased, from the default purchasing agents 110, 120, . . . 1n0.

In addition, the processing unit 320 may further include a map processing module 328. The map processing module 328 marks the position information (such as present positions or -purchasing paths) of the candidate purchasing agents on a map and transmits the marked map to the client 400 through the data transmission platform 200. The client 400 displays the marked map, which may help the user of the client 400 select one of the candidate purchasing agents according to the marked map.

To provide the user of the client 400 better proxy-purchasing experience, the candidate purchasing agents may be further filtered according to blacklist or whitelists. Hence, the real-time, localized and mobile matching platform for proxy purchase 300 may further include a blacklist database 340 or a whitelist database 350, the processing unit 320 may further include a blacklist module 329 or a whitelist module 330. The blacklist database 340 is electrically connected with the processing unit 320 and stores several blacklists. The blacklists stored in the blacklist database 340 may include the blacklists of the default purchasing agents 110, 120, . . . 1n0, the blacklist of the client 400 or other blacklists. Hence, in one embodiment, the blacklist module 329 may remove at least one purchasing agent, the blacklist of which includes the client 400, from the candidate purchasing agents without transmitting to the client 400 if the client 400 is on at least one of the blacklists of the candidate purchasing agents.

In another embodiment, the blacklist module 329 may determine if the candidate purchasing agents is on the blacklist of the client 400. If at least one of the candidate purchasing agents is on the blacklist of the client 400, the blacklist module 329 may remove at least one purchasing agent, which is on the blacklist of the client 400, from the candidate purchasing agents without transmitted to the client 400. Therefore, probability of terrible proxy-purchasing experiences for the user of the client 400 may be reduced.

The whitelist database 350 is electrically connected with the processing unit 320 and stores several whitelists. The whitelists stored in the whitelist database 350 may include the whitelists of the default purchasing agents 110, 120, . . . 1n0, the whitelist of the client 400 or other whitelists. The whitelist module 330 may determine if the candidate purchasing agents is on the whitelist of the client 400. If at least one of the candidate purchasing agents is on the whitelist of the client 400, the whitelist module 330 may mark the candidate purchasing agent, which is on the whitelist of the client 400. The whitelist module 330 may utilize highlight or other effect for marking. Hence, users of the client 400 can notice that the marked candidate purchasing agent is the preferred choice.

Besides, the processing unit 320 may further include a list processing module 331. The list processing module 331 registers the product to be iii purchased on a proxy purchase list of the selected purchasing agent. The list processing module 331 transmits the registered proxy purchase list of the selected purchasing agent to the selected purchasing agent through the data transmission platform 200. Therefore, as the selected purchasing agent receives the registered proxy purchase list, the user of the selected purchasing agent can proxy purchase real-time according to the registered proxy purchase list.

Figure 2:
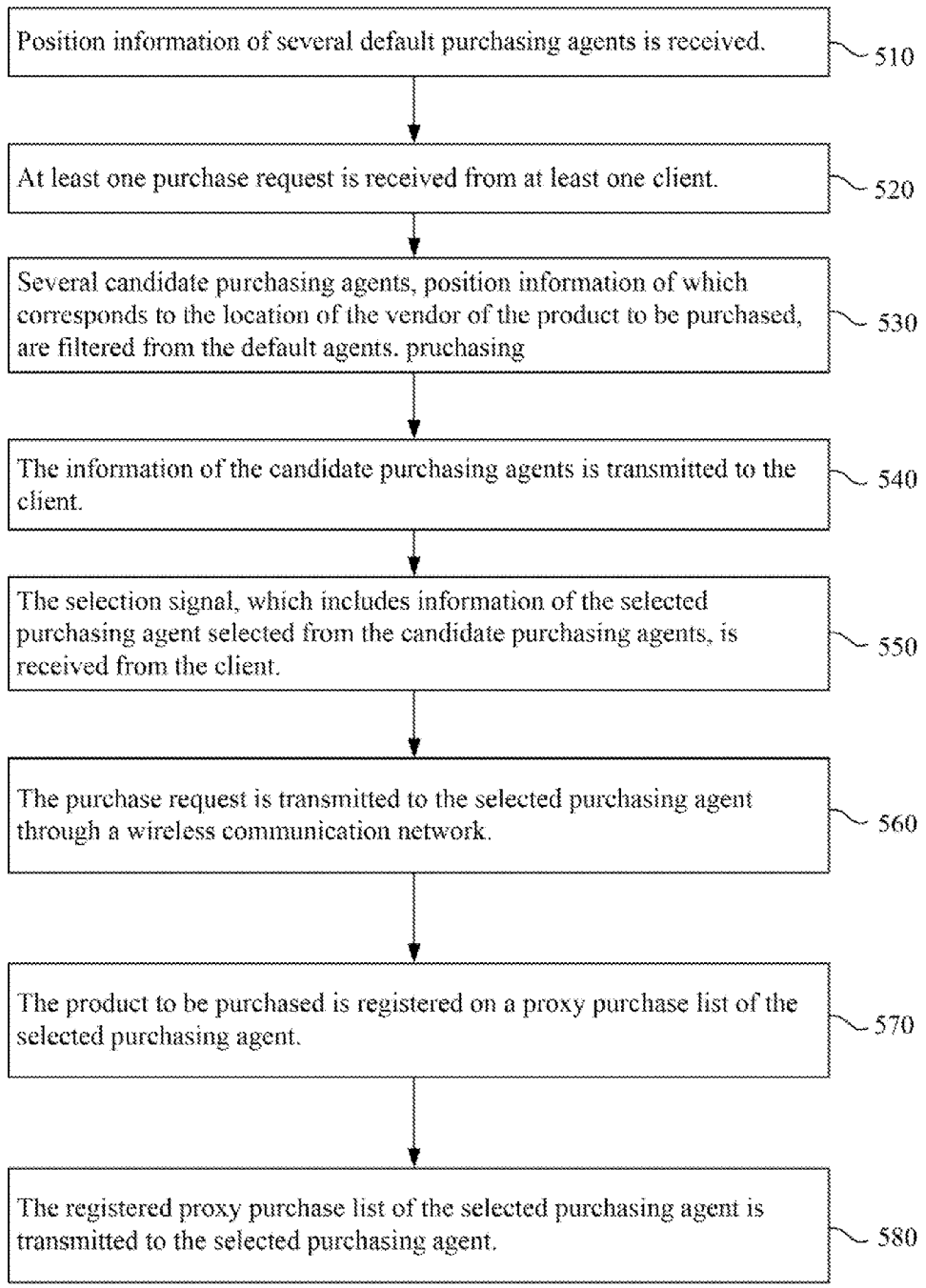
FIG. 2 is a flow diagram of a real-time, localized and mobile matching method for proxy purchase according to another embodiment of this invention.

FIG. 2 is a flow diagram of a real-time, localized and mobile matching method for proxy purchase according to another embodiment of this invention. In the real-time, localized and mobile matching method for proxy purchase, when a user of a client wants to authorize others to proxy purchase a product, several purchasing agents, which correspond to the location of the vendor of the product to be purchased, are provided to the client for selection. A computer-readable medium may be encoded with a computer program to execute the real-time, localized and mobile matching method for proxy purchase. The real-time, localized and mobile matching method for proxy purchase 500 includes the following steps:

In step 510, position information of several default purchasing agents is received. The position information of the default purchasing agents may include present positions, proxy-purchasing paths, or any other position related information of the default purchasing agents. The default purchasing agents may generate their present positions through GPS or other positioning method. Besides, users of the default purchasing agents can input position information through the default purchasing agents. Then, the default purchasing agents may transmit their position information through a wireless communication network. The wireless communication network may follow 2G, 3G, 3.5G, 4G, Wi-Fi, IEEE 802.11 series, Zigbee or any other wireless communication network protocol.

In step 520, at least one purchase request is received from at least one client. The purchase request includes information of at least one product to be purchased and location of at least one vendor of the product to be purchased.

In step 530, several candidate purchasing agents, position information of which corresponds to the location of the vendor of the product to be purchased, are filtered from the default purchasing agents. In one embodiment, the candidate purchasing agents, present positions of which are around the location of the vendor of the product to be purchased, may be filtered from the default purchasing agents in step 530. In another embodiment, the candidate purchasing agents, proxy-purchasing paths of which pass through the location of the vendor of the product to be purchased, may be filtered from the default purchasing agents in step 530. In addition, a delivery point assigned by the user of the client may be taken into consideration for filtering in step 530. Therefore, in another embodiment, a delivery point may be received from the client and the candidate purchasing agents, proxy-purchasing paths of which pass through the location of the vendor of the product to be purchased and the delivery point, may be filtered from the default purchasing agents in step 530. Besides, products, which the default purchasing agents are willing to proxy purchase, may be taken into consideration. Hence, in another embodiment of step 530, candidate product lists for proxy purchase may be obtained from the default purchasing agents and the candidate purchasing agents, position information of which corresponds to the location of the vendor of the product to be purchased and in the candidate product lists for proxy purchase includes the product to be purchased, may be filtered from the default purchasing agents.

In step 540, the information of the candidate purchasing agents is transmitted to the client. Then, the user of the client may select one of the candidate purchasing agents, and the client may transmit a selection signal, which is generated according to the selected candidate purchasing agent. In addition, the position information (such as present positions or -purchasing paths) of the candidate purchasing agents may be marked on a map and the marked map may be transmitted to the client. The client may display the marked map, which may help the user of the client select one of the candidate purchasing agents according to the marked map.

To provide the user of the client better proxy-purchasing experience, the candidate purchasing agents may be further filtered according to blacklist or whitelists before the information of the candidate purchasing agents is transmitted (step 540). Therefore, a blacklist database or a whitelist database may be provided. The blacklist database may store several blacklists, and the whitelist database may store several whitelists. The blacklists stored in the blacklist database may include the blacklists of the default purchasing agents, the blacklist of the client or other blacklists. The whitelists stored in the whitelist database may include the whitelists of the default purchasing agents the whitelist of the client or other whitelists. In one embodiment, if the client is on the blacklists of the candidate purchasing agents may be determined before step 540. If the client is on at least one of the blacklists of the candidate purchasing agents at least one purchasing agent, the blacklist of which includes the client, may be removed from the candidate purchasing agents without transmitting to the client. In another embodiment, if the candidate purchasing agents is on the blacklist of the client may be determined before step 540. If at least one of the candidate purchasing agents is on the blacklist of the client, at least one purchasing agent, which is on the blacklist of the client, from the candidate purchasing agents without transmitting to the client. Therefore, probability of terrible proxy-purchasing experiences for the user of the client may be reduced by further filtering according to the blacklists.

Moreover, if the candidate purchasing agents is on the whitelist of the client may be determined before step 540. If at least one of the candidate purchasing agents is on the whitelist of the client, the candidate purchasing agent, which is on the whitelist of the client, is marked. Hence, users of the client can notice that the marked candidate purchasing agent is the preferred choice.

In step 550, the selection signal, which includes the information of selected purchase agent selected from the candidate purchasing agents, is received from the client.

In step 560, the purchase request is transmitted to the selected purchasing agent through a wireless communication network. The wireless communication network may follow 2G, 3G, 3.5G, 4G, Wi-Fi, IEEE 802.11 series, Zigbee or any other wireless network. Therefore, the user of the selected purchasing agent may proxy purchase the product according to the received purchase request.

In addition, in step 570, the product to be purchased may be registered on a proxy purchase list of the selected purchasing agent. In step 580, the registered proxy purchase list of the selected purchasing agent is transmitted to the selected purchasing agent. Therefore, when more than one client select the same purchasing agent for proxy purchase, the user of the selected purchasing agent can know what to proxy purchase real-time according to the registered proxy purchase list.

Above all, several candidate purchasing agents, which correspond to the location of the vendor of the product to be purchased, can be provided to the client for selection. In addition, the delivery point, which is assigned by the user of the client, may be taken into consideration for further filtering candidate purchasing agents. Hence, the user of the client may assign a delivery point for convenient delivery. Moreover, users of purchasing agent can receive requests for proxy purchase at any time, any place. In other words, users of purchasing agent don't need to take product lists for proxy purchase from clients before going out to buy products to be proxy-purchased.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A real-time, localized and mobile matching method for proxy purchase, comprising:
   receiving position information of a plurality of default purchasing agents;
   receiving at least one purchase request from at least one client, wherein the purchase request comprises information of at least one product to be purchased and location of at least one vendor of the product to be purchased;
   filtering, by a filtering module, a plurality of candidate purchasing agents, position information of which corresponds to the location of the vendor of the product to be purchased, from the default purchasing agents;
   transmitting the information of the candidate purchasing agents to the client, such that a selection signal, which comprises information of a selected purchasing agent, wherein the selected purchasing agent is authorized to proxy purchase the product and is selected from the candidate purchasing agents, is received from the client; and
   transmitting the purchase request to the selected purchasing agent through a wireless communication network.

2. The real-time, localized and mobile matching method for proxy purchase of claim 1, wherein the position information of the default purchasing agents comprises present positions of the default purchasing agents, and filtering the candidate purchasing agents, position information of which corresponds to the location of the vendor of the product to be purchased, from the default purchasing agents comprises:
   filtering the candidate purchasing agents, present positions of which are around the location of the vendor of the product to be purchased, from the default purchasing agents.

3. The real-time, localized and mobile matching method for proxy purchase of claim 1, wherein position information of the default purchasing agents comprises present positions of the default purchasing agents, and receiving position information of the default purchasing agents comprises:
   making the default purchasing agents utilize Global Positioning System iii (GPS) generate the present positions of the default purchasing agents; and
   receiving the generated present positions of the default purchasing agents through the wireless communication network.

4. The real-time, localized and mobile matching method for proxy purchase of claim 1, wherein the position information of the default purchasing agents comprises proxy-purchasing paths of the default purchasing agents, and filtering the candidate purchasing agents, position information of which corresponds to the location of the vendor of the product to be purchased, from the default purchasing agents comprises:
   filtering the candidate purchasing agents, proxy-purchasing paths of which pass through the location of the vendor of the product to be purchased, from the default purchasing agents.

5. The real-time, localized and mobile matching method for proxy purchase of claim 1, wherein the position information of the default purchasing agents comprises proxy-purchasing paths of the default purchasing agents, and filtering the candidate purchasing agents, position information of which corresponds to the location of the vendor of the product to be purchased, from the default purchasing agents comprises:
   receiving a delivery point from the client; and
   filtering the candidate purchasing agents, proxy-purchasing paths of which pass through the location of the vendor of the product to be purchased and the delivery point, from the default purchasing agents.

6. The real-time, localized and mobile matching method for proxy purchase of claim 1, further comprising:
   obtaining candidate product lists for proxy purchase from the default purchasing agents; and
   filtering the candidate purchasing agents, position information of which corresponds to the location of the vendor of the product to be purchased and in the candidate product lists for proxy purchase comprises the product to be purchased, from the default purchasing agents.

7. The real-time, localized and mobile matching method for proxy purchase of claim 1, further comprising:
   marking the position information of the candidate purchasing agents on a map; and
   transmitting the marked map to the client, such that the client displays the marked map.

8. The real-time, localized and mobile matching method for proxy purchase of claim 1, further comprising:
   providing a blacklist database, wherein the blacklist database stores a plurality of blacklists of the default purchasing agents;
   determining if the client is on the blacklists of the candidate purchasing agents;
   removing at least one purchasing agent, the blacklist of which comprises the client, from the candidate purchasing agents if the client is on at least one of the blacklists of the candidate purchasing agents.

9. The real-time, localized and mobile matching method for proxy purchase of claim 1, further comprising:
providing a blacklist database, wherein the blacklist database stores a blacklist of the client;
determining if the candidate purchasing agents is on the blacklist of the client; and
removing at least one purchasing agent, which is on the blacklist of the client, from the candidate purchasing agents, if at least one of the candidate purchasing agents is on the blacklist of the client.

10. The real-time, localized and mobile matching method for proxy purchase of claim 1
providing a whitelist database, wherein the whitelist database stores a plurality of whitelists, and the whitelists stored in the whitelist database comprises the whitelist of the client;
determining if the candidate purchasing agents is on the whitelist of the client; and
marking the candidate purchasing agent, which is on the whitelist of the client, if at least one of the candidate purchasing agents is on the whitelist of the client.

11. The real-time, localized and mobile matching method for proxy purchase of claim 1, further comprising:
registering the product to be purchased on a proxy purchase list of the selected purchasing agent; and
transmitting the registered proxy purchase list of the selected purchasing agent to the selected purchasing agent.

12. A real-time, localized and mobile matching system for proxy purchase, comprising:
a plurality of default purchasing agents, comprising:
a plurality of position generating units, generating position information of the default purchasing agents;
a data transmission platform; and
a real-time, localized and mobile matching platform for proxy purchase, building connection with the default purchasing agents through the data transmission platform, comprising:
a purchasing agent database; and
a processing unit, electrically connected with the purchasing agent database, comprising:
a position processing module, receiving the position information of the default purchasing agents through the data transmission platform, and storing the position information of the default purchasing agents into the purchasing agent database;
a request receiving module, receiving at least one purchase request from at least one client through the data transmission platform, wherein the purchase request comprises information of at least one product to be purchased and location of at least one vendor of the product to be purchased;
a filtering module, filtering a plurality of candidate purchasing agents, position information of which corresponds to the location of the vendor of the product to be purchased, from the default purchasing agents;
a selecting module, transmitting the information of the candidate purchasing agents to the client through the data transmission platform, such that a selection signal, which comprises information of a selected purchasing agent, wherein the selected purchasing agent is authorized to proxy purchase the product and is selected from the candidate purchasing agents, is received from the client; and
a request transmitting module, transmitting the purchase request to the selected purchasing agent through the data transmission platform.

13. The real-time, localized and mobile matching system for proxy purchase of claim 12, wherein the position information of the default purchasing agents comprises present positions of the default purchasing agents, and the filtering module comprises:
a position filter, filtering the candidate purchasing agents, present positions of which are around the location of the vendor of the product to be purchased, from the default purchasing agents.

14. The real-time, localized and mobile matching system for proxy purchase of claim 12, wherein the position information of the default purchasing agents comprises proxy-purchasing paths of the default purchasing agents, and the filtering module comprises:
a path filter, filtering the candidate purchasing agents, proxy-purchasing paths of which pass through the location of the vendor of the product to be purchased, from the default purchasing agents.

15. The real-time, localized and mobile matching system for proxy purchase of claim 12, wherein the position information of the default purchasing agents comprises proxy-purchasing paths of the default purchasing agents, and the filtering module comprises:
a path filter, receiving a delivery point from the client through the data transmission platform, and filtering the candidate purchasing agents, proxy-purchasing paths of which pass through the location of the vendor of the product to be purchased and the delivery point, from the default purchasing agents.

16. The real-time, localized and mobile matching system for proxy purchase of claim 12, wherein each of the position generating units is a GPS unit or an input unit.

17. The real-time, localized and mobile matching system for proxy purchase of claim 12, wherein the processing unit further comprises:
a map processing module, marking the position information of the candidate purchasing agents on a map and transmitting the marked map to the client through the data transmission platform, such that the client displays the marked map.

18. The real-time, localized and mobile matching system for proxy purchase of claim 12, wherein the real-time, localized and mobile matching platform for proxy purchase further comprises:
a blacklist database, electrically connected with the processing unit, stores a plurality of blacklists,
wherein the blacklists stored in the blacklist database comprise the is blacklists of the default purchasing agents, and the processing unit further comprising:
a blacklist module, removing at least one purchasing agent, the blacklist of which comprises the client, from the candidate purchasing agents if the client is on at least one of the blacklists of the candidate purchasing agents.

19. The real-time, localized and mobile matching system for proxy purchase of claim 12, wherein the real-time, localized and mobile matching platform for proxy purchase further comprises:
a blacklist database, electrically connected with the processing unit, stores a plurality of blacklists, wherein the blacklists stored in the blacklist database comprise the blacklist of the client, and the processing unit further comprises:
a blacklist module, determining if the candidate purchasing agents is on the blacklist of the client, and removing at least one purchasing agent, which is on the blacklist of the client, from the candidate purchasing agents if at least one of the candidate purchasing agents is on the blacklist of the client.

20. The real-time, localized and mobile matching system for proxy purchase of claim 12, wherein the real-time, localized and mobile matching platform for proxy purchase further comprises:
a whitelist database, electrically connected with the processing unit, storing a plurality of whitelists,
wherein the whitelists stored in the whitelist database comprises the whitelist of the client, the processing unit further comprises:
a whitelist module, determining if the candidate purchasing agents is on the whitelist of the client, and marking the candidate purchasing agent, which is on the whitelist of the client, if at least one of the candidate purchasing agents is on the whitelist of the client.

21. The real-time, localized and mobile matching system for proxy purchase of claim 12, wherein the filtering module comprises:
a product filter, obtaining candidate product lists for proxy purchase from the default purchasing agents through the data transmission platform and filtering the candidate purchasing agents, position information of which corresponds to the location of the vendor of the product to be purchased and in the candidate product lists for proxy purchase comprises the product to be purchased, from the default purchasing agents.

22. The real-time, localized and mobile matching system for proxy purchase of claim 12, wherein the processing unit further comprises:
a list processing module, registering the product to be purchased on a proxy purchase list of the selected purchasing agent, and transmitting the registered proxy purchase list of the selected purchasing agent to the selected purchasing agent through the data transmission platform.

\* \* \* \* \*